G. D. DUDLEY.
Corn Popper.
No. 67,736.
Patented Aug. 13, 1867.
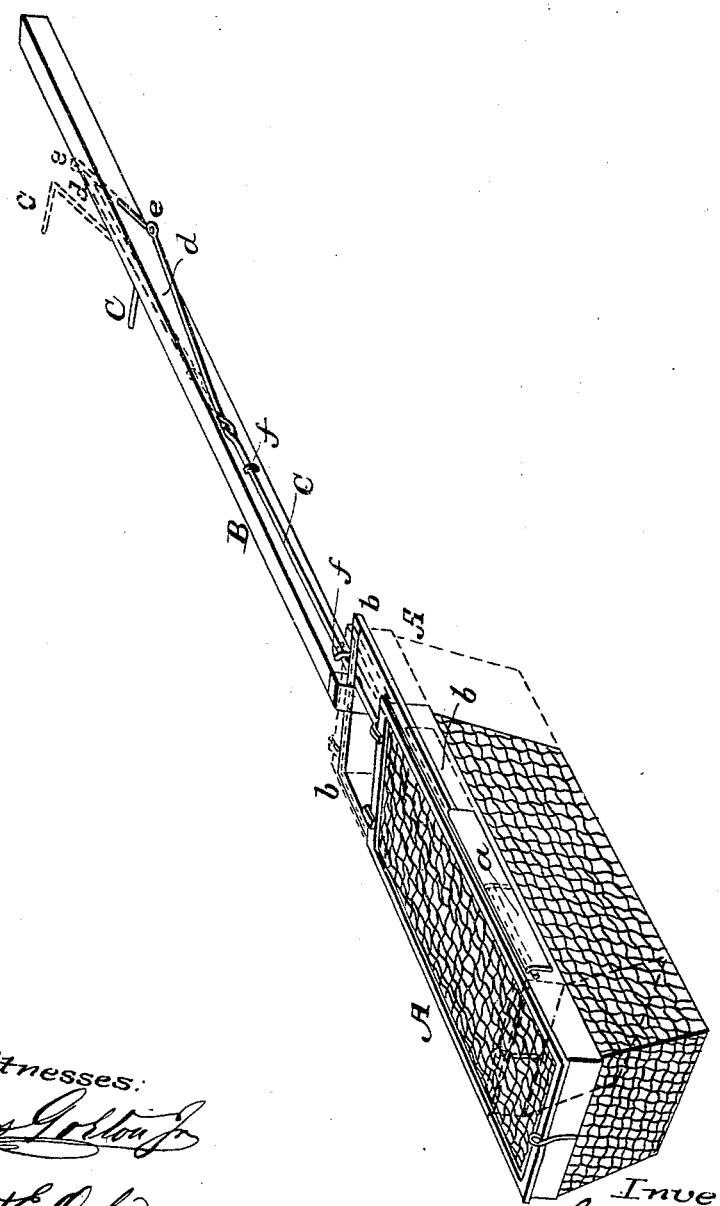

United States Patent Office.

GEORGE D. DUDLEY, OF LOWELL, MASSACHUSETTS, ASSIGNOR TO WOODS, SHERWOOD & CO., OF THE SAME PLACE.

Letters Patent No. 67,736, dated August 13, 1867.

CORN-POPPER.

The Schedule referred to in these Letters Patent and making part of the same.

TO ALL WHOM IT MAY CONCERN:

Be it known that I, GEORGE D. DUDLEY, of Lowell, in the county of Middlesex, and State of Massachusetts, have invented a new and useful Improvement in Corn-Poppers; and I do hereby declare the following to be a full, clear, and exact description thereof, reference being had to the accompanying drawings, figures and letters of reference thereon, making part of this specification.

The view in perspective shown in the drawings will serve to illustrate clearly my invention.

My invention consists, first, in giving the corn-popper a horizontal reciprocating motion for the purpose of shaking the corn while being popped. It further consists in an arrangement of means for reciprocating the corn-popper, which will be fully set forth hereafter.

To enable others skilled in the art to make and use my invention, I will describe the construction and operation thereof.

A represents the popper or receptacle for holding the corn, made of woven wire cloth or perforated metal, and provided with a cover of the same material. B is the handle, to which are secured two parallel rods $b\ b$. To the sides of the corn-popper A are secured ears or slides, $a\ a$, through which the parallel rods $b\ b$ are inserted and slide freely. In the upper part of the handle B is a crank, C, which by means of the connecting-rods $d$ and $e$ communicates a reciprocating motion to the popper as the crank is revolved. The long rod $e$, the end of which is attached to the popper, is held in place on the handle B by means of the staples $ff$.

Operation.

The operation will be as follows: The popper being provided with the requisite quantity of corn, is held over the fire and gently agitated to facilitate the popping, and prevent the corn being burned by turning the crank. The colored lines in the drawing show the popper in one position, or drawn back, and the dark lines in the other position, or extended.

Having thus fully described my invention, I claim—

1. The combination of the popper A with the parallel rods $b\ b$, and handle B, constructed and operated substantially as described.

2. The crank C, connecting-rods $e\ d$, in combination with the popper A and parallel rods $b\ b$, the whole constructed and operating substantially as described and specified.

GEORGE D. DUDLEY.

Witnesses:
WILLIAM WILSON,
E. A. SANBORN.